W. H. LEWIS & J. A. PILCHER.

BRAKE ARRANGEMENT FOR SIX WHEEL TRUCKS.

APPLICATION FILED NOV. 15, 1913.

Reissued Jan. 6, 1914.

13,670.

2 SHEETS—SHEET 1.

Witnesses

V. Frederiksen.

Jno D Thomas

Inventors

William H. Lewis

John A. Pilcher

W. H. LEWIS & J. A. PILCHER.

BRAKE ARRANGEMENT FOR SIX WHEEL TRUCKS.

APPLICATION FILED NOV. 15, 1913.

Reissued Jan. 6, 1914.

13,670.

2 SHEETS—SHEET 2.

Witnesses

V. Frederiksen.

Jno A Thomas

Inventors

William H. Lewis

John A. Pilcher

UNITED STATES PATENT OFFICE.

WILLIAM H. LEWIS AND JOHN A. PILCHER, OF ROANOKE, VIRGINIA.

BRAKE ARRANGEMENT FOR SIX-WHEEL TRUCKS.

13,670. Specification of Reissued Letters Patent. Reissued Jan. 6, 1914.

Original application filed September 6, 1912, Serial No. 718,910. Divided and application filed January 14, 1913, Serial No. 741,959. Original No. 1,068,674, dated July 29, 1913. Application for reissue filed November 15, 1913. Serial No. 801,315.

*To all whom it may concern:*

Be it known that we, WILLIAM H. LEWIS and JOHN A. PILCHER, citizens of the United States, residing at Roanoke, in the county of Roanoke and State of Virginia, have invented certain new and useful Improvements in Brake Arrangements for Six-Wheel Trucks, of which the following is a specification.

The object of this invention is to provide a simple and efficient arrangement of brake beams, levers, rods, etc., for six-wheel trucks for railway cars.

With this object in view, our invention consists in the combination and arrangement of parts as will be more fully hereinafter described, and particularly pointed out in the appended claims.

Figure 1:
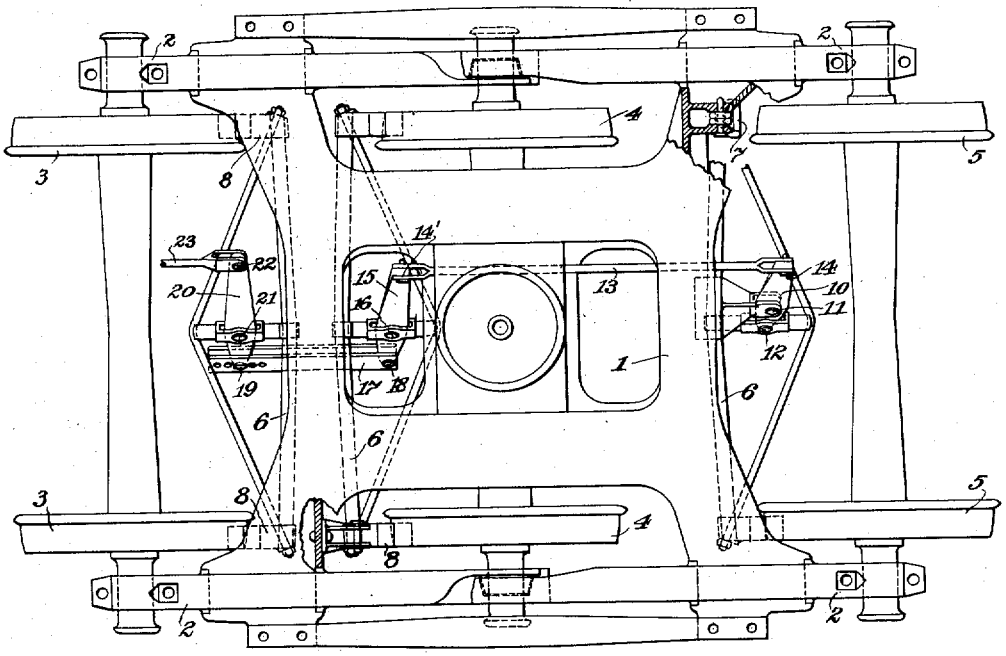
Figure 2:
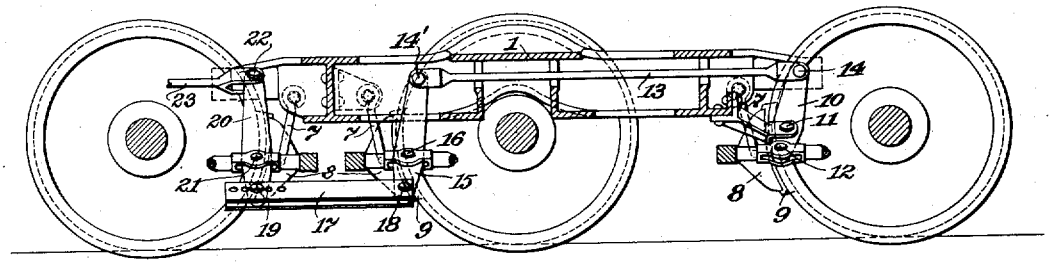
Figure 3:
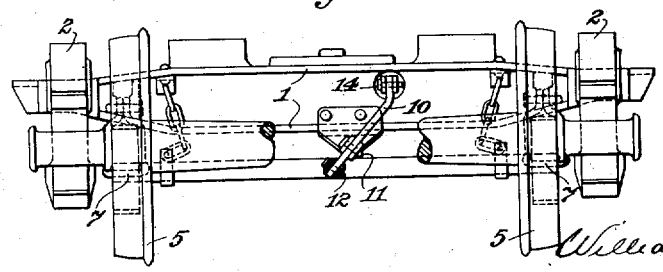
Figure 4:
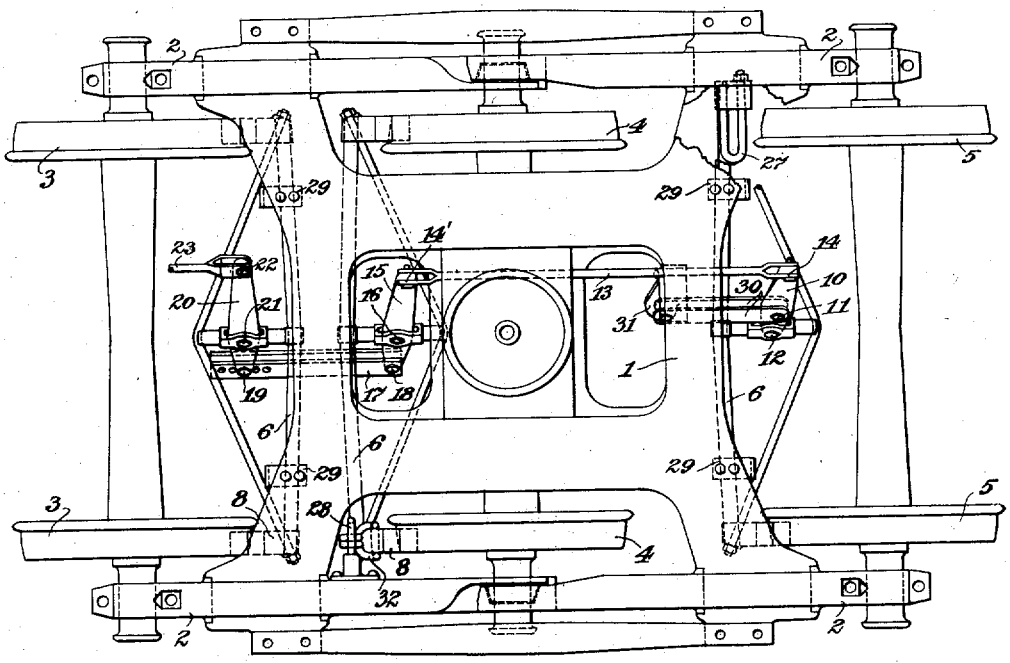
Figure 5:
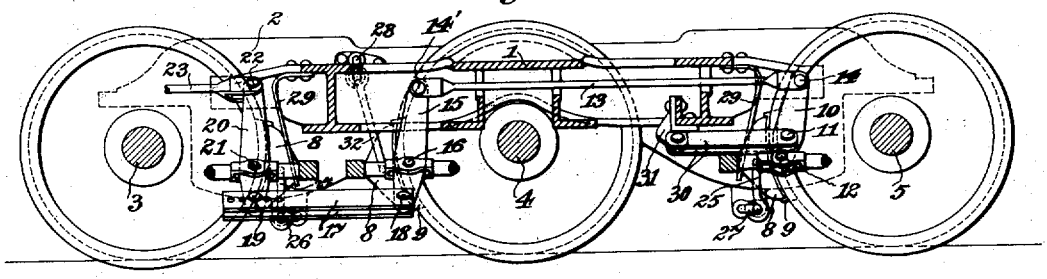

In the drawings, Figure 1 represents in plan view a truck with our invention applied, showing the brake beams for the truck as hanging from the bolster of the truck, Fig. 2 is a side elevation in section, and Fig. 3 an end elevation of the same. Fig. 4 is a plan view showing an alternate arrangement in which the brake beams are suspended from and supported by the truck side frames. Fig. 5 is a side elevation in section, and Fig. 6 an end elevation partly in section of this latter arrangement of beams.

Referring to the drawings in which like parts are given the same reference numbers wherever they occur, 1 represents the bolster of a six wheel truck of the type shown and described in our previous application for Letters Patent, Serial No. 718,910, filed Sept. 6, 1912, 2 represents the side frames of the same, and 3—4 and 5 the pairs of wheels on their respective axles.

The brake beams 6 are hung from the bolster 1 in the customary manner, by means of U-shaped hangers 7 which are hinged to the bolster at the top by means of transverse, horizontal pintles, the brake heads 8 being hooked over the U-shaped hangers at the bottom. The brake shoes 9 are keyed to the brake heads 8 in the usual manner.

The brake beam 6 which is intended for use in braking the wheels 5 is actuated by means of a dead lever 10 which is permanently fulcrumed at a point 11 to the bolster 1, or to some other convenient part, the brake beam 6 being pivotally connected to the bottom of the lever 10 at 12. As will be hereinafter shown, the location of this fulcrum point should be such that the braking power will be equalized among all of the beams. A pull rod 13 is pivotally connected at one end to the top of lever 10 at 14 in such a manner that a longitudinal pull in the rod 13 will force the brake shoes 9 against the wheels 5. The other end of the pull rod 13 is pivotally connected at 14′ to the top of a floating lever 15. This floating lever 15 is intended to operate the brake beam for the middle pair of wheels 4 and is pivotally connected to said brake beam at 16.

A push rod 17 is pivotally connected at its inner end to the bottom of lever 15 at 18 and extends longitudinally of the truck between and below the axles of the wheels 4 and 3, the outer end of the same being pivotally connected at 19 to the bottom of a live lever 20 which is intended to actuate the brake beam for the outer truck wheels 3, the brake beam being pivotally connected to the lever 20 at 21. The top of the lever 20 is arranged at 22 for pivotal connection to a pull member 23 from the brake operating mechanism on the car body.

The operation of our invention is as follows: When the hand or power brake on the car body is applied, the rod 23 pulls the top of lever 20 outward and draws the brake shoes up against the wheels 3. The lever 20 fulcrums at 21 and pushes the bottom of lever 15 inward, pushing the brake shoes up against the wheels 4. Lever 15 in turn fulcrums about the point 16 and the top of lever 15 moves outward, pulling with it the rod 13 and the top of lever 10. Lever 10 being permanently fulcrumed at 11, the brake beam for wheels 5, which is connected to lever 10 below the fulcrum point 11, will be moved in the opposite direction, forcing the shoes against the wheels 5.

As previously referred to, the location of the fulcrum point 11 in lever 10 should be such that when the similar ends of levers 20 and 15 are of the same or relative lengths, the load on the brake beam for wheels 5 will be the same as for the other two pairs of wheels.

Figure 6:
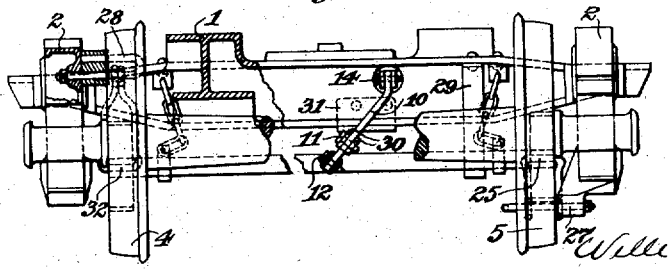

As previously stated, Figs. 4, 5 and 6 show the same arrangement of brake levers and rods, but show the beams hung from or supported by the side frames instead of from the bolster as in Figs. 1, 2 and 3. With this arrangement the vertical movement of the bolster on the springs relative to the wheels does not carry the brake beams with it as is the case in the previous arrangement. The U-shaped brake beam supports 24 and 25 for the two outer pairs of wheels are pivotally connected to the side frames at points 26 and 27 below the brake heads. The beam for the middle pair of wheels, however, is hung by a U-shaped hanger 32 from a point 28 on a side frame in the identical manner described in the previous arrangement of brakes hung from the bolster. With this arrangement it is necessary to provide release springs 29 for the outer brake beams to throw them back from the wheels when the brake is released. The beam for the middle wheels, however, as well as all of those in the arrangement with the brakes hung from the bolster will drop away from their own weight and so require no release springs. The operation of the levers, etc., in this latter arrangement is the same as already described for brakes hung from the bolster.

In trucks where the brake beams are supported from the side frames and at the same time the dead lever 10 is fulcrumed to the bolster, it is necessary to provide a floating fulcrum 11, for the lever 10. This is accomplished by means of the links 30 which are pivoted at their inner ends to a bracket 31 on the bolster, the outer ends of same forming the fulcrum point 11 for the lever 10.

It will be evident that changes might be made in the details of this arrangement without departing from the essential features of our invention.

Having thus described our invention, what we claim is,

1. In a brake arrangement for six-wheel trucks the combination of a lever having a pivot point between its extremities, a brake beam pivotally connected to one of the extremities of said lever, a tension member pivotally connected at one end to the other extremity of said lever, a second lever to which is pivotally connected at one extremity the other end of said tension member, a second brake beam pivotally connected to said second lever between the extremities thereof, a compression member pivotally connected at one extremity to the other extremity of said second lever, a third lever to which is pivotally connected at one extremity the other end of said compression member, a third brake beam pivotally connected to said third lever between the extremities thereof, said third lever being further provided with a pivot point at its other extremity, and means for actuating said system of levers from the brake mechanism on the car body, substantially as described.

2. In a brake arrangement for six-wheel trucks, the combination of a dead lever fulcrumed between its extremities to some convenient part of the truck, a brake beam pivotally connected to one extremity of said dead lever, a tension member pivotally connected at one end to the other extremity of said dead lever, a floating lever to which is pivotally connected at one extremity the other end of said tension member, a second brake beam pivotally connected to said floating lever between the extremities thereof, a compression member pivotally connected at one end to the other extremity of said floating lever, a live lever to which is pivotally connected at one extremity the other end of said compression member, a third brake beam pivotally connected to said live lever between the extremities thereof, and means for actuating the other extremity of said live lever from the brake mechanism of the car body, substantially as described.

In testimony whereof we affix our signatures in presence of two witnesses.

WILLIAM H. LEWIS.
JOHN A. PILCHER.

Witnesses:
H. B. WADE,
ROY K. BROWN.